United States Patent [19]

Michaels et al.

[11] E Patent Number: Re. 33,611

[45] Reissued Date of Patent: Jun. 11, 1991

[54] ENVIRONMENTALLY SEALED GROUNDING BACKSHELL WITH STRAIN RELIEF

[75] Inventors: Leonard H. Michaels, Warrenville; Robert A. Miller, Woodridge, both of Ill.

[73] Assignee: Molex Incorporated, Lisle, Ill.

[21] Appl. No.: 515,160

[22] Filed: Apr. 26, 1990

Related U.S. Patent Documents

Reissue of:

[64] Patent No.: 4,857,015
Issued: Aug. 15, 1989
Appl. No.: 214,074
Filed: Jul. 1, 1988

[51] Int. Cl.[5] ..... H01R 13/648

[52] U.S. Cl. ..... 439/610; 439/98; 439/462

[58] Field of Search ..... 174/65 SS, 75 C, 78, 174/79; 439/95, 96, 98, 273, 320, 349, 449, 460–462, 551, 583, 584, 610, 819, 840

[56] References Cited

U.S. PATENT DOCUMENTS 3,739,076 6/1973 Schwartz ..... 439/98 X
3,830,957 8/1974 Oberdiear ..... 439/98 X
4,213,664 7/1980 McClenan ..... 439/584 X
4,547,623 10/1985 Van Brunt ..... 174/65 SS X

*Primary Examiner*—Eugene F. Desmond
*Attorney, Agent, or Firm*—Louis A. Hecht; Stephen Z. Weiss; Charles S. Cohen

[57] ABSTRACT

A grounding backshell assembly is provided for achieving a grounded electrical connection to a conductive braid of a cable, and for simultaneously achieving effective strain relief and environmental sealing. The backshell assembly comprises a generally cylindrical backshell having a toroidally configured coil spring mounted therein. A plunger with a leading concave cam surface is slidably inserted in the backshell for camming engagement with the grounding spring. A toroidally configured strain relief coil spring is disposed around the cable at the rear end of the plunger. A compression nut having a concave camming surface therein is threadably engageable with the backshell such that the concave cam surface thereof is operative to radially compress the strain relief spring and to urge the plunger into camming interengagement with the grounding spring. An elastomeric seal is resiliently engaged with the rear end of the compression nut and is further resiliently engaged with the cable. A tightening of the compression nut onto the backshell deforms the elastomeric seal into tight environmental sealing engagement with the cable and further contributes to environmental sealing.

34 Claims, 3 Drawing Sheets

ENVIRONMENTALLY SEALED GROUNDING BACKSHELL WITH STRAIN RELIEF

Matter enclosed in heavy brackets [ ] appears in the original patent but forms no part of this reissue specification; matter printed in italics indicates the additions made by reissue.

BACKGROUND OF THE INVENTION

The transmission of high frequency electrically transmitted signals often requires a shielded cable to prevent signal interference or noise resulting from ambient EMI/RFI. The shielding typically may be provided by an electrically conductive braid that surrounds an array of individual insulated conductors within the cable. The braid will extend the entire length of the cable except for the ends where the cable will be appropriately dressed to enable the conductors therein to be electrically connected to the terminals of a connector.

The above described shielded cables and associated connectors frequently are used in military applications and other applications requiring high frequency electrical signal transmission. In many such applications the connector/cable interface should be environmentally sealed and should provide a superior strain relief connection to ensure that the quality of the electrical connection is not affected by any physical abuse to which the connector and cable might be subjected. Furthermore, the electrical and mechanical termination of the cable in the connector should ensure that the EMI/RFI shield continues through the connector despite the required termination or dressing of the cable end. The cable/connector interface should also account for the inevitable fact that the termination and connection work often will be performed by field personnel working in substantially uncontrolled environments with possible limited access to tools.

The connectors for the above described shielded cable, as used in the above described environments, typically have been provided with backshell and frontshell combinations that are mechanically connectable to one another. The backshell is further mechanically mounted to the cable, while the frontshell is mechanically mounted to a connector housing. Both the backshell and frontshell have been formed from metallic material, and the backshell has further included appropriate electrically conductive means for engaging the cable braid to ensure that the EMI/RFI shield continues through the backshell, the front-shell and the remainder of the connector assembly. Although many prior art backshell assemblies have provided adequate EMI/RFI shielding for the above described braided cables, they have either not provided adequate strain relief and environmental sealing, or have relied upon complex multi-component structures for achieving strain relief and environmental sealing.

One grounding backshell is shown in U.S. Pat. No. 3,739,076 which issued to Schwartz on June 12, 1973. The connector shown in U.S. Pat. No. 3,739,076 comprises a rearwardly projecting neck portion having an array of externally disposed threads thereon. An end member or backshell is provided with an array of internal threads for threaded engagement over the rearwardly projecting neck of the connector. A coil spring formed into a generally toroidal configuration is disposed intermediate the rearwardly projecting neck of the connector and the backshell. The toroidal spring is further disposed to be aligned with the exposed conductive braid of the dressed cable. The threaded engagement of the rearwardly projecting neck of the connector with the backshell radially compresses the toroidal spring into electrical contact with the braid. The toroidal spring thus electrically grounds the braid to the backshell and connector housing to achieve a continuous EMI/RFI shielding across the connector. The connector shown in U.S. Pat. No. 3,739,076 is further provided with an O-ring disposed intermediate the toroidal spring and the backshell. The O-ring is intended to achieve environmental sealing of the connector. However, the O-ring is disposed at a location within the connector that would permit the accumulation of moisture or the like inside a portion of the connector assembly. It generally is desirable to keep moisture and other such environmental contaminants entirely out of the connector structure if possible. In many instances, a single O-ring disposed within a connector is not considered sufficient environmental sealing. Furthermore, the O-ring is not intended to and cannot achieve strain relief, and the connector shown in U.S. Pat. No. 3,739,076 does not provide any alternate means for achieving the necessary strain relief.

Other prior art connectors have included variations of the structures shown in U.S. Pat. No. 3,739,076. For example, one such prior art connector includes a metallic ground ring secured intermediate the backshell and a threaded adapter. The ground ring is dimensioned to electrically ground the braid of the cable. These other prior art backshell connector assemblies have relied upon internally disposed O-rings, grommets, washers or the like to achieve some degree of environmental sealing. Strain relief has been provided by separate cable clamps which are connectable to the prior art backshell. For example, an adapter which is engageable with the prior art backshell may include a rearwardly directed array of external threads. A strain relief clamp may include a corresponding array of internally disposed threads which are engageable with the threads of the adapter. The strain relief clamp further comprises a rearwardly disposed cable clamp which comprises a pair of bolts extending generally transverse to the cable and on opposite sides thereof. The strain relief clamp is first threaded onto the adapter and then the transversely extending bolts are tightened to urge clamping members into a tight strain relief clamping engagement with the cable. Prior art backshell connector assemblies of this general type are undesirable because of the complex plural components required. Furthermore, the assembly is time-consuming and complex and requires field personnel to utilize several different tools.

In view of the above, it is an object of the subject invention to provide a grounding backshell with improved strain relief.

Another object of the subject invention is to provide a grounding backshell which achieves exceptional environmental sealing.

Still another object of the subject invention is to provide a grounding backshell that can be easily assembled by field personnel.

An additional object of the subject invention is to provide a grounding backshell with means for simultaneously providing environmental sealing and strain relief.

A further object of the subject invention is to provide an environmentally sealed strain relief backshell which simultaneously provides grounding to a shielded cable in one single connecting operation.

SUMMARY OF THE INVENTION

The subject invention is directed to an environmentally sealed grounding backshell assembly that achieves superior strain relief automatically as part of the mounting of the assembly to the cable. The backshell assembly includes forwardly disposed means for connecting the backshell to the frontshell of the connector assembly. For example, the forward end of the backshell may comprise an array of threads which are engageable with a corresponding array of threads on the frontshell.

The backshell assembly comprises a generally cylindrical metallic backshell having a central through aperture for receiving the cable. The assembly further comprises a grounding coil spring disposed in a generally toroidal configuration such that the axis of the coiled spring defines a circle. The toroidally configured spring is dimensioned to be disposed in the central through aperture of the backshell. The backshell may be configured to permit the toroidal grounding spring to be inserted therein from the rearward end of the backshell. However, the backshell assembly further comprises restriction means to prevent complete passage of the toroidal grounding spring the entire distance therethrough. The coiled configuration of the grounding spring enables the toroidal structure to be compressed radially inwardly. The dimensions of the toroidal grounding spring are such that the cable can be readily passed therethrough prior to compression of the spring. However, compression of the grounding spring, as explained herein, will be sufficient to achieve a grasping electrical ground to the braid or other shield of the cable.

The restriction means within the backshell against which the toroidal grounding spring is urged may comprise a reversible washer of generally stepped cylindrical configuration. The reversal of this washer can change the axial position along the backshell at which the grounding spring begins its compression. Thus, the amount of compression can be varied by the orientation of the reversible washer, as explained further below.

The backshell assembly further comprises means for radially compressing the grounding spring, such as a plunger having a central through aperture dimensioned to receive the cable. The outer surface of the plunger is dimensioned for telescoping engagement within the rearward portion of the backshell. The forward end of the plunger may define a cam surface of generally concave frustoconical configuration. More particularly, the orientation of the cam surface is such that radially outward portions thereof are at axially forward positions relative to the radially inward portions. As a result of this construction, the axial telescoping movement of the plunger within the backshell will urge the toroidal grounding spring radially inwardly into electrical grounding contact with the braid of the cable.

The backshell assembly further comprises a second coil spring formed into a toroidal configuration as described above. This second toroidal spring defines a cable gripping strain relief spring having dimensions approximately equal to or slightly greater than the dimensions of the grounding spring. The strain relief spring is disposed adjacent the rearward end of the plunger.

A compression means is provided for radially compressing the strain relief spring and urging the strain relief spring forward. The compression means may be a nut threadably engageable with the rearward end of the backshell. The compression nut may comprise a central through aperture with a concave forwardly facing cam surface which is engageable with the strain relief spring. The strain relief spring may be disposed between the cam surface of the compression nut and the rearwardly facing surface of the plunger. Thus, the forward movement of the strain relief spring will generate an equivalent forward movement of the plunger and a resulting compression of the grounding spring. The length of the plunger and the location of the compression nut cam surface preferably are such that the strain relief spring will be urged into a portion of the dressed cable on which the outer insulation is disposed. In particular, each coil of the strain relief spring will deform the cable insulating jacket to ensure a strain relief connection that cannot be achieved by O-rings and the like. The inward compression of the toroidal strain relief spring will securely grippingly engage the cable at a location thereon spaced from the electrical grounding connection of the grounding spring to the braid. Thus, the strain relief spring is structually and functionally distinct from the prior art which provides a single spring for electrical grounding.

The compression means of the backshell assembly may further comprise means for retaining an elastomeric seal. For example, the outer circumference of the compression nut may be defined by a generally annular groove or ridge.

An elastomeric seal is provided for secure environmentally sealed connection to the backshell assembly. For example, the elastomeric seal may comprise in inwardly directed flange extending thereabout and dimensioned to engage the groove or ridge of the compression means. The rearward end of the elastomeric seal extends rearwardly beyond the compression nut and radially inwardly toward the cable. A through aperture at the rearward end of the seal is dimensioned to resiliently grip the cable for secure environmental sealing. Preferably, the rearwardmost portion of the seal is of generally frustoconical convex configuration. As a result of this configuration, the forward movement of the compression means relative to the backshell will pull the forward portions of the elastomeric seal in an axially forward direction. Therefore, the frustoconical convex rearward portion of the seal will gradually move into a more acute frustoconical configuration with a correspondingly tighter resilient gripping engagement around the cable. This interengagement of the elastomeric seal with the cable ensures both an efficient environmental sealing and further contributes to the strain relief of the backshell assembly. It will be appreciated that both the strain relief and the environmental sealing are achieved as part of the interengagement of the compression means and backshell for the purpose of achieving the grounding electrical connection with the braid of the cable. In particular, the simple rotational interengagement of the compression nut with the backshell simultaneously achieves the grounding electrical connection, the required strain relief and an efficient environmental seal. No additional tools or structures are needed to achieve these important objectives.

DETAILED DESCRIPTION OF THE PREFERRED EMBODIMENT

Figure 1:
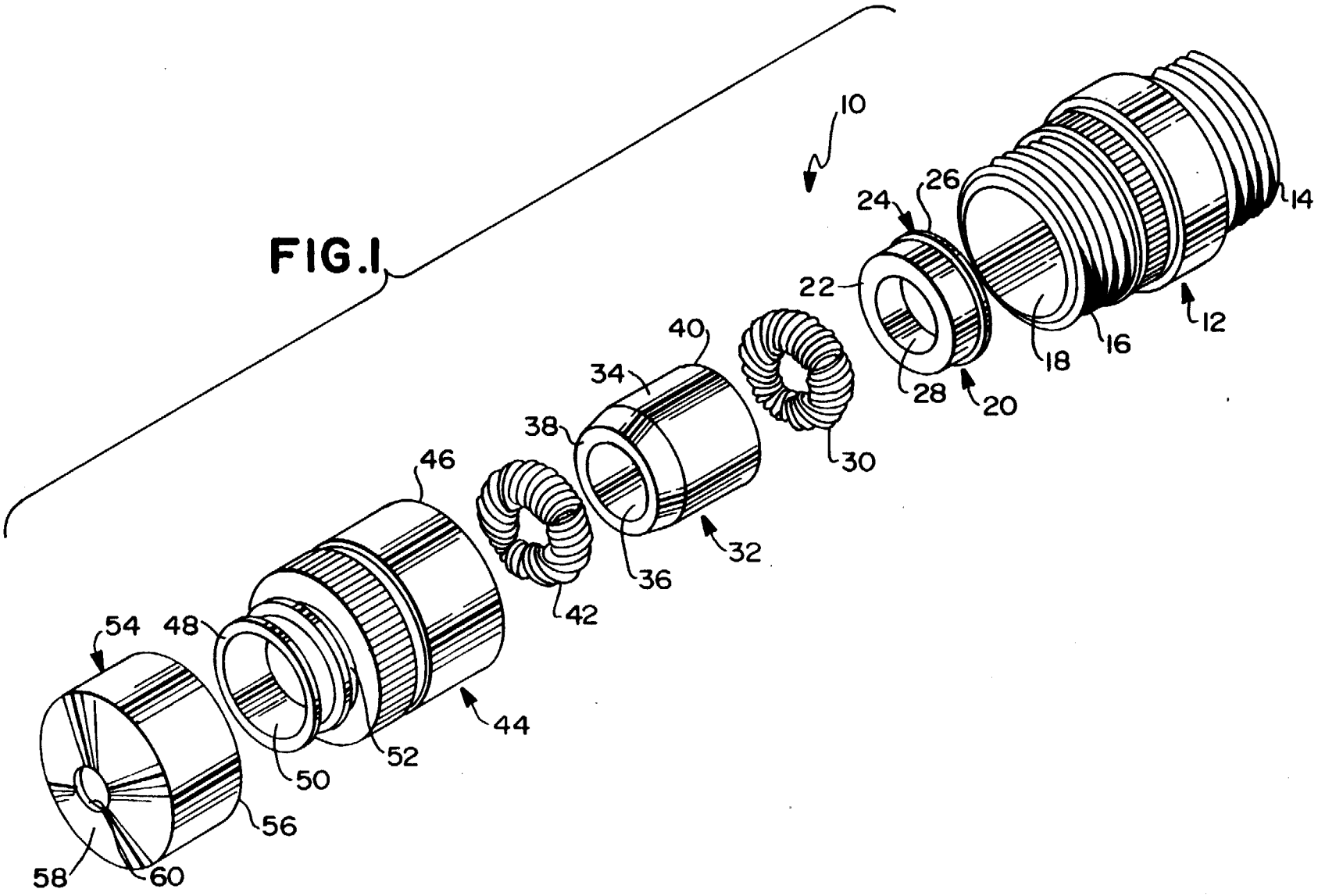
FIG. 1 is an exploded perspective view of the backshell assembly of the subject invention.
Figure 2:
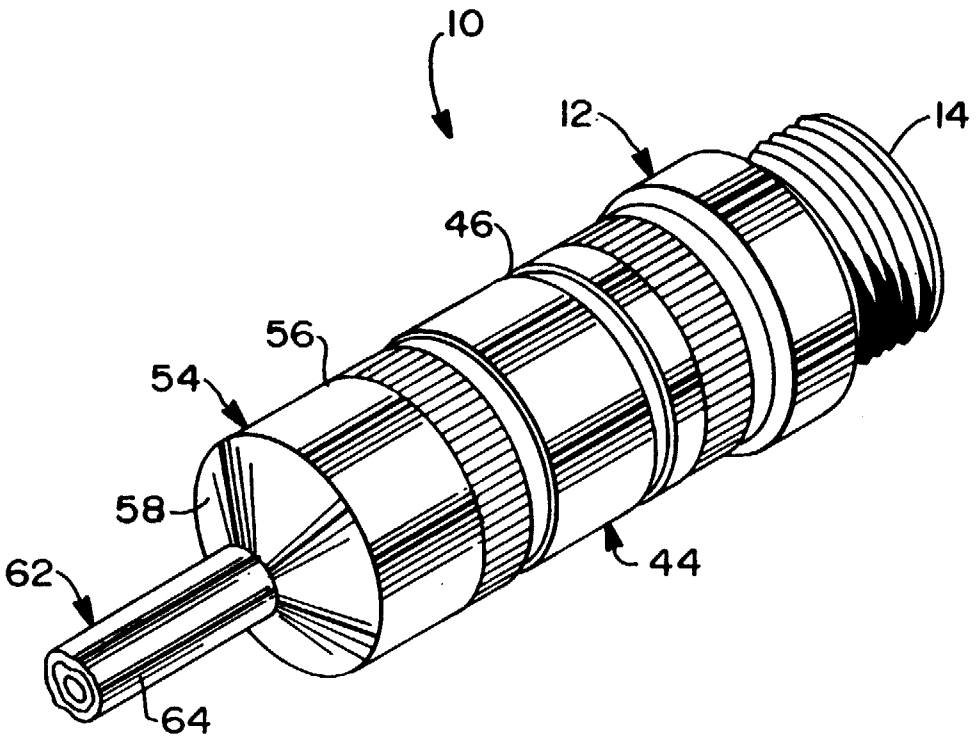
FIG. 2 is a perspective view of the assembled backshell assembly.

The backshell assembly of the subject invention is identified generally by the numeral 10 in FIGS. 1–6. As shown most clearly in FIG. 1, the backshell assembly 10 comprises a generally cylindrical, electrically conductive metallic backshell 12 having an externally threaded forward end 14 and an externally threaded rearward end 16. A generally cylindrical through aperture 18 extends entirely through the backshell 12 from the forward end 14 thereof to the rearward end 16. The specific construction and configuration of the central through aperture 18 is described in greater detail below.

The assembly further comprises a metallic reversible washer 20 having a small diameter end 22 and a large diameter end 24 which is defined by a generally annular outwardly extending flange 26. A cable receiving aperture 28 extends entirely through the washer 20. The flange 26 is dimensioned to be slidably inserted into the through aperture 18 of the backshell 12 from the rearward end 16 thereof. More particularly, the flange 26 is diametrically dimensioned to be securely retained against a shoulder in the backshell 12, while the small diameter end 22 of the reversible washer 20 is dimensioned to pass beyond the shoulder in the backshell 12. Thus, as explained below, the axial position of the washer 20 relative to the rearward end 16 of the backshell 12 can be changed by reversing the washer 20.

The backshell assembly 10 further comprises a grounding spring 30 which is a coiled spring formed into a generally toroidal shape. The toroidal configuration of the coiled grounding spring 30 enables the grounding spring 30 to be compressed radially inwardly. The dimensions of the coiled toroidal grounding spring 30 are such that the cable can be readily inserted therethrough in the uncompressed condition of the grounding spring 30. However, the inward compression of the grounding spring 30 is sufficient to enable the grounding spring 30 to graspingly engage the EMI/RFI shield of the cable. The dimensions of the toroidal grounding spring 30 also are such that the grounding spring 30 will achieve axial engagement with the reversible washer 20 in either of the reversed orientations of the washer 20, and in both the unbiased and compressed conditions of the grounding spring 30. As will be shown below, the grounding spring 30 is disposed at a longitudinal location in the backshell assembly 10 to achieve an electrically grounding connection with the electrically conductive braid of a shielded cable.

The assembly 10 further comprises a plunger 32 which also preferably is formed from a metallic material and is of generally cylindrical configuration. More particularly, the plunger 32 includes a cylindrical outer surface 34 which is dimensioned to be slidingly telescopingly received within the central through aperture 18 of the backshell 12. The plunger 32 further comprises a generally cylindrical interior surface 36 extending entirely therethrough. The cylindrical interior through aperture 36 is dimensioned to slidingly receive the cable therethrough, as illustrated and described below. The plunger 32 includes opposed rearward and forward ends 38 and 40. The forward end 40 of the plunger 32 defines a camming surface as explained below for compressing the toroidal grounding spring 30 radially inwardly and into grounding contact with the braided shield of the cable secured in the backshell assembly 10.

The backshell assembly 10 further comprises a coiled strain relief spring 42 which is formed into a generally toroidal configuration and which preferably, but not necessarily, is formed from metal. The toroidal strain relief spring 42 in its unbiased condition is dimensioned to receive the insulated cable axially therethrough. However, the strain relief spring 42 is radially compressible to achieve a secure strain relief connection to the jacketed cable. The strain relief spring 42 is further dimensioned to be placed in abutting end-to-end relationship with the rear end 38 of the plunger 32 in both the unbiased and compressed conditions of the strain relief spring 42.

A generally cylindrical compression nut 44 which may be formed from metallic or plastic material is further provided as part of the backshell assembly 10. The compression nut 44 includes opposed forward and rearward ends 46 and 48. The forward end 46 is provided with an internal array of threads interengageable with the externally threaded rearward end 16 of the backshell 12. The interior of the compression nut 44 is further provided with a forwardly facing cam surface for engaging and compressing the strain relief spring 42. The axial movement of the compression nut 44 to achieve this radially inward compression of the strain relief spring 42 is achieved by the simple threaded interconnection of the compression nut 44 with the backshell 12. The rearward end 48 of the compression nut 44 is provided with an inwardly directed annular groove 52 disposed around the exterior thereof. The annular groove 52 is dimensioned to lockingly engage a seal as explained further below.

The backshell assembly 10 further comprises an elastomeric seal 54 having opposed forward and rearward ends 56 and 58 and having a central through aperture 60 extending entirely therethrough. The through aperture 60 adjacent the rearward end 58 of seal 54 is dimensioned to resiliently engage the jacketed cable to which the backshell assembly 10 is mounted. As will be explained in greater detail, the rearward end 58 of the seal 54 is of generally convex frustoconical configuration. The forward end 56 of the seal 54 includes an inwardly directed generally annular ridge (not shown in FIG. 1) which is dimensioned to engage the annular groove 52 of the compression nut 44.

Figure 3:
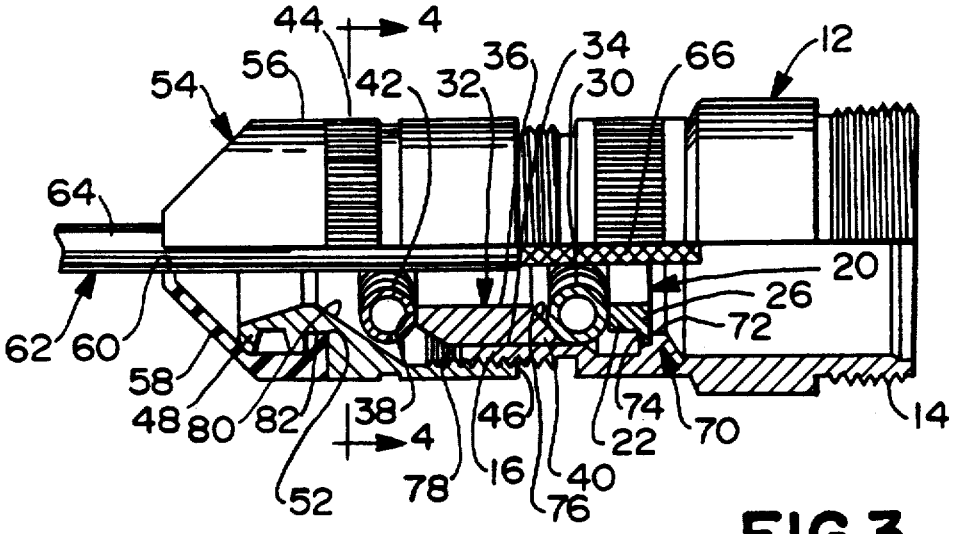
FIG. 3 is a cross-sectional view of the backshell assembly shown in FIG. 2 prior to secure interengagement with the cable.
Figure 5:
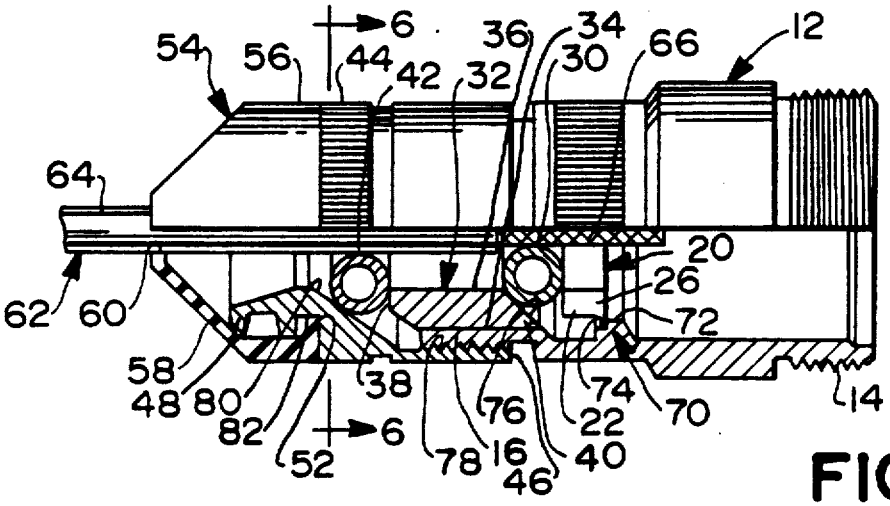
FIG. 5 is a cross-sectional view similar to FIG. 3 but showing the backshell assembly fully engaged with the cable.
Figure 4:
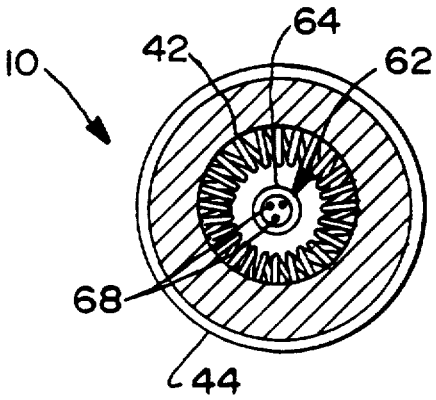
FIG. 4 is a cross-sectional view taken along line 4—4 in FIG. 3.
Figure 6:
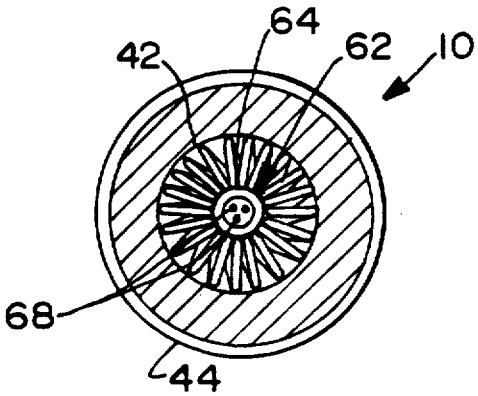
FIG. 6 is a cross-sectional view taken along line 6—6 in FIG. 5.

The backshell assembly 10 is illustrated in its assembled condition in FIGS. 2–6. In particular, FIGS. 3 and 4 show the backshell assembly 10 in its assembled but not fully tightened position relative to a cable 62. More particularly, the cable 62 is provided with an insulating jacket 64 extending thereabout. A braided electrically conductive EMI/RFI shield 66 is disposed intermediate the outer insulating jacket 64 and a plurality of separate insulated conductors 68 are disposed therein as shown in FIGS. 4 and 6. The cable 62 is prepared or dressed by removing both the outer insulating jacket 64 and the conductive braid 62 from an extreme end thereof to permit the conductors 68 therein to be securely connected to terminals in a connector (not shown). The dressing of the cable 62 further provides a portion of the braided EMI/RFI shield 66 to be exposed to complete the grounding throughout the metallic backshell 12 and the connector (not shown) as explained further below.

The backshell assembly 10 is assembled by first disposing the reversible washer 20 in the backshell 12 such that the flange 26 of the reversible washer 20 is firmly seated against the annular ledge 70 within the backshell 12. It will be noted that the annular ledge 70 defines a minor diameter portion 72 having an internal diameter substantially equal to or slightly greater than the external diameter of the small end 22 of the reversible washer 20. However, the internal diameter defined by portion 72 of ledge 70 is less than the diameter defined by the annular flange 26 at the opposed end 24 of the reversible washer 20. The ledge 70 further defines a major diameter portion 74 having an internal diameter substantially equal to or slightly greater than the diameter defined by the annular flange 26 at end 24 of the reversible washer 20. As shown in FIG. 3, the reversible washer 20 is positioned in the backshell 12 such that the flange 26 thereof is firmly seated in the large diameter portion 74 of ledge 70, and such that the small end 22 of washer 20 is directed toward the rear 16 of the backshell 12. It will be appreciated, however, that the washer 20 can be reversed such that the small end 22 thereof is slidably inserted through the minor diameter portion 72 of the ledge 70. This reversal of the washer 20 will change its axial position relative to the rearward end 16 of the backshell 12, and will thereby change the amount of camming achieved by the plunger 32. Thus, the reversed orientations of the washer 20 enable the assembly 10 to be used with cables of different diameters.

The backshell assembly 10 is further assembled by inserting the generally toroidally configured grounding coil spring 30 into the central aperture 18 of backshell 12 from the rearward end 16 thereof. More particularly, the grounding spring 30 is advanced axially into contact with the rearwardly disposed portion of the reversible washer 20. The particular axial location of the grounding spring 30 will depend upon the reversible orientation of the washer 20.

The plunger 32 is next slidably inserted into the backshell 12 such that the forward end 40 thereof is urged toward the grounding spring 30. As shown most clearly in FIG. 3, the forward end 40 of the plunger 32 is characterized by a concave frustoconical cam surface 76 which is oriented such that the outer cylindrical surface 34 of the plunger 32 leads the inner cylindrical surface 36 thereof at the forward end 40. As will be explained further below, the axial movement of the plunger 32 causes the cam surface 76 thereof to urge the grounding spring 30 in a generally radially inward direction.

The backshell assembly 10 next includes the generally toroidal strain relief coil spring 42 disposed in abutting generally coaxial contact with the rear end 38 of the plunger 32. The compression nut 44 is then disposed over the strain relief spring 42 and over the rear end 16 of the backshell 12. More particularly, the compression nut 44 includes an internally disposed array of threads 78 adjacent the forward end 46 thereof which are engageable with the externally threaded rearward end 16 of the backshell 12. The compression nut 44 further comprises a concave generally frustoconical cam surface 80 disposed on an interior portion intermediate the opposed front and rear ends 46 and 48. The cam surface 80 is disposed to engage the toroidal strain relief spring 42 upon the threaded engagement of the compression nut 44 with the threaded rearward end 16 of the backshell 12. The inward compression of the strain relief spring 42 progresses with additional threaded interengagement of the compression nut 44 with the backshell 12.

As shown in FIG. 3, the elastomeric seal 54 of the backshell assembly 10 includes an inwardly directed flange 82 at the forward end 56 thereof. The flange 82 is disposed and dimensioned to resiliently engage the inwardly directed groove 52 of the compression nut 44.

As illustrated more clearly in FIG. 3, the cable 62 is directed axially through the above described components of the backshell assembly 10. The cable 62 is dressed or prepared such that the conductive braid 66 thereof is exposed at a location to be substantially in line with the grounding spring 30. The extreme end of the cable 62 is prepared to expose the conductors 68 thereof and to enable electrical connection to terminals in a connector assembly (not shown). In this untightened condition, as shown in FIGS. 3 and 4, it will be noted that the cable 62 can readily move in an axial direction relative to the backshell assembly 10, and in particular with respect to the strain relief spring 42 and the grounding spring 30.

The grounding, strain relief and environmental sealing for the backshell assembly 10 is simply accomplished by merely threadably completing the interconnection of the compression nut 44 to the backshell 12 as shown in FIGS. 5 and 6. More particularly, complete threaded interengagement of the compression nut 44 with the backshell 12 causes the concave frustoconical cam surface 80 of the compression nut 44 to move in an axial direction into contact with the strain relief spring 42. The forces generated by this camming action urge the strain relief spring in both an axial direction and a radially inward direction. The axial movement of the strain relief spring 42 generates axial forces on the plunger 32, which in turn causes the concave frustoconical cam surface 76 thereof to contact the grounding spring 30. The grounding spring 30 is firmly seated against the reversible washer 20 and cannot move in an axial direction. Therefore, the grounding spring 30 reacts to the camming forces exerted by the plunger 32 by compressing radially inwardly and into a graspingly secure electrically grounding contact with the conductive braid 66 of the cable 62. As the grounding spring 30 tightens against the braid 66, continued longitudinal movement of the plunger 32 is reduced. Therefore, the further threaded interengagement of the compression nut 44 with the backshell 12 causes the cam surface 80 of compression nut 44 to urge the strain relief spring 42 primarily in a radially inward direction and into a tight strain relief circumferential engagement with the jacketed portion of the cable 62.

As noted above, the elastomeric seal 54 is dimensioned such that the rearward aperture 60 thereof resiliently engages the jacket 64 of the cable 62. The threaded interengagement of the compression nut 44 to the backshell 12 effectively moves the compression nut 44 in an axial direction relative to the backshell 12. This longitudinal movement of the compression nut 44 deflects the frustoconical end 58 of the elastomeric seal 54 into a more acute alignment relative to the cable 62. This deflection tightens the elastomeric seal 54 around the cable 62 thereby enhancing the environmental sealing effect and further contributing to strain relief. As a result, the simple threaded interengagement of the compression nut 44 onto the backshell 12 achieves a high quality grounding of the braided cable 62 by virtue of the radially inward compression of the grounding spring 30. Furthermore, the simultaneous radially inward compression of the strain relief spring 42 against the jacketed portion of the cable 62 provides effective strain relief for the cable 62. This same threaded interengagement causes a deformation of the elastomeric seal 54 which enhances the environmental sealing effect and further contributes to strain relief.

While the invention has been described with respect to certain preferred embodiments, it is apparent that various changes can be made without departing from the scope of the invention as defined by the appended claims.

What is claimed is:

1. An environmentally sealed grounding backshell assembly for strain relief mounting to a jacketed cable having an electrically conductive EMI shield, said assembly comprising:

a metallic backshell having opposed forward and rearward ends and a cable receiving aperture extending therethrough;

a toroidally configured, radially compressible, metallic coil grounding spring disposed in said backshell for surrounding the cable disposed therein;

restriction means in said backshell forwardly of said grounding spring for limiting axial movement of the grounding spring relative to said backshell;

plunger means disposed in the backshell for selective longitudinal movement relative thereto, said plunger means comprising opposed forward and rearward ends, the forward end of said plunger means defining a cam for urging the grounding spring against the restriction means and for radially compressing said grounding spring;

a toroidally configured, radially compressible strain relief spring for surrounding the cable and disposed adjacent the rear end of said plunger means;

compression means engageable with the backshell for selective longitudinal movement relative thereto, said compression means comprising a forwardly facing concave cam surface for engaging and radially compressing the strain relief spring; and environmental sealing means for mounting to the compression means and for environmentally sealing the cable mounted in said assembly, whereby the axial advancement of said compression means relative to said backshell radially compresses the grounding spring into grounding contact with the shield of the cable and radially compresses the strain relief spring into strain relief engagement with the jacketed cable.

2. A backshell assembly as in claim 1 wherein said environmental seal is formed from an elastomeric material.

3. A backshell assembly as in claim 2 wherein said environmental seal comprises opposed forward and rearward ends, said forward end of said environmental seal being resiliently engageable with said compression means, the rearward end of said environmental seal being of generally frustoconical convex outward configuration, whereby the axial movement of said compression means relative to said backshell deforms said elastomeric environmental seal into tight environmentally sealing engagement with the jacketed cable and contributes to the strain relief of said assembly.

4. A backshell assembly as in claim 3 wherein the compression means comprises an inwardly directed generally annular groove extending thereabout, and wherein the forward end of said elastomeric environmental seal includes an inwardly directed generally annular flange for resiliently engaging the groove of said compression means.

5. A backshell assembly as in claim 1 wherein said rearward end of said backshell comprises an array of threads, and wherein the forward end of said compression means comprises an array of threads mateable with the threads on the rearward end of said backshell, the threaded engagement between said backshell and said compression means defining the means for longitudinally advancing the compression nut relative to the backshell.

6. A backshell assembly as in claim 5 wherein the restriction means comprises a generally annular inwardly directed ledge integral with said backshell.

7. A backshell assembly as in claim 6 wherein the restriction means further comprises a reversible washer engageable with said ledge of said backshell and disposed intermediate said ledge and said grounding spring.

8. A backshell assembly as in claim 7 wherein said reversible washer is formed from a metallic material and has opposed forward and rearward ends, the forward end of said washer defining a major diameter portion, and the rearward end of said washer defining a minor diameter portion, said minor diameter portion being dimensioned to pass through the ledge of said backshell, while the major diameter portion thereof is dimensioned to engage said ledge, whereby the relative axial position of said washer relative to the rear end of said backshell can be varied by reversing the washer relative to the ledge.

9. A backshell assembly as in claim 1 wherein the camming surface of said plunger means is generally frustoconical in configuration.

10. A backshell assembly as in claim 1 wherein the camming surface of said compression means is generally frustoconical in configuration.

11. A backshell assembly as in claim 1 wherein the forward end of said backshell comprises an array of threads.

12. An environmentally sealed backshell asembly for strain relief mounting to a jacketed cable having an electrically conductive braid therein, said backshell assembly comprising:

a metallic backshell having opposed forward and rearward ends and a longitudinally aligned cable receiving aperture extending entirely therethrough, said rearward end of said backshell comprising an array of threads;

a toroidally configured, radially compressible, metallic coiled grounding spring disposed in said backshell;

a plunger slidably disposed in the rearward portion of said backshell, said plunger having opposed forward and rearward ends and a cable receiving aperture extending therebetween, the forward end of said plunger defining a concave frustoconical camming surface for engaging and radially compressing the grounding spring;

a toroidally configured, radially compressible coiled strain relief spring disposed adjacent the rearward end of said plunger;

a compression nut having opposed forward and rearward ends and a cable receiving aperture extending therebetween, the forward end of said compression nut being provided with an array of threads engaged with the threads on the rearward end of said backshell, the cable receiving aperture of said compression nut defining a forwardly facing concave camming surface engaged with the strain relief spring; and an elastomeric seal having opposed forward and rearward ends and a cable receiving aperture, the forward end of said elastomeric seal resiliently engaging said compression nut, the rearward end of said elastomeric seal being of generally frustoconical convex configuration and being dimensioned to resiliently grip the cable, whereby the threaded interconnection of said compression nut to said backshell urges the grounding spring into grounding electrical connection with the braid of the cable and simultaneously urges the strain relief spring into gripping engagement with the cable while tightening the resilient engagement between the elastomeric seal and the cable for enhanced environmental sealing protection and additional strain relief.

13. A backshell assembly as in claim 12 comprising restriction means for limiting the movement of the grounding spring in the backshell.

14. A backshell assembly as in claim 13 wherein the restriction means comprises a stop integral with the backshell.

15. A backshell assembly as in claim 14 wherein the restriction means further comprises a reversible washer having opposed first and second ends, said first end of said washer being dimensioned to pass through the stop, the second end of said washer being dimensioned to engage the stop, whereby the position of the washer relative to at least one end of the backshell is determined by the reversible orientation of the washer.

16. An environmentally sealed grounding backshell assembly for strain relief mounting to a cable, said assembly comprising:

a metallic backshell having opposed forward and rearward ends and a cable receiving aperture extending therebetween;

a metallic coiled grounding spring formed into a compressible toroidal configuration and disposed in the metallic backshell;

a first concave cam means disposed adjacent said grounding spring for radially compressing the grounding spring;

plunger means for effecting relative movement between the grounding spring and the first concave cam means;

a coiled strain relief spring formed into a compressible toroidal configuration and disposed adjacent said plunger means and spaced from said grounding spring;

a second concave cam means disposed adjacent said strain relief spring for radially compressing the strain relief spring;

compression means engaged with the metallic backshell for generating relative movement between the second cam means and the strain relief spring, and for generating corresponding movement of the plunger means; and elastomeric environmental sealing means resiliently engaging the cable and mounted to at least one other portion of said assembly.

17. An assembly as in claim 16 wherein at least one of said first and second cam means is integral with the plunger means.

18. An assembly as in claim 16 wherein said second cam means is integral with the compression means.

19. An assembly as in claim 16 further comprising means for adjustably limiting the movement of the grounding spring in the backshell.

20. An assembly as in claim 16 wherein said metallic backshell and said compression means each comprises an array of threads, said threads comprising the means for generating relative movement between the second cam means and the strain relief spring.

*21. A terminal backshell assembly for strain relief mounting to a cable having a conductive shield, comprising:*

*a backshell member;*

*compression means engageable with the backshell member for longitudinal movement relative thereto;*

*means defining an axial passage through the engaged backshell member and compression means for receiving said cable;*

*an annular plunger member disposed between the backshell member and the compression means;*

*a first resilient ring disposed between the compression means and the plunger member for engaging the cable;*

*a second resilient, electrically conductive ring disposed between the plunger member and the backshell member for engaging the conductive shield of the cable; and*

*variable means mounted on one of said backshell member and compression means for engaging the respectively adjacent ring on a side thereof opposite the plunger means, the variable means being positionally variable axially to vary the distance said adjacent ring can resiliently move radially and thereby accommodate cables of varying diameters.*

*22. The assembly of claim 21 wherein one of said resilient rings comprises an annular spring.*

*23. The assembly of claim 21 wherein both of said resilient rings comprise annular springs.*

*24. The assembly of claim 21 wherein said variable means is ring-shaped and includes surface means for engaging said respectively adjacent ring at different axial locations in response to positionally varying the variable means.*

*25. The assembly of claim 24 wherein said backshell member has ledge means for mounting the ring-shaped variable means, the variable means being shaped to have different axial dimensions in a direction facing said respectively adjacent ring depending on the position in which the variable means is mounted on said ledge means.*

*26. The assembly of claim 25 wherein said ring-shaped variable means has a radially outwardly directed flange for engaging the ledge means of the backshell member, the variable means having a greater axial dimension on one side of the flange than the other whereby the variable means can be positionally reversed to change the axial location at which the variable means engages said respectively adjacent ring.*

*27. The assembly of claim 21 wherein said backshell member and said variable means have complementarily*

*engageable mounting means, and the variable means has a greater axial dimension on one side of the mounting means than the other whereby the variable means can be positionally reversed to change the axial location at which the variable means engages said respectively adjacent ring.*

*28. A backshell assembly for strain relief mounting to a cable, comprising:*

*first and second members assembled for relative longitudinal movement and defining an axial passage through the assembly for receiving said cable;*

*a resilient ring between said members about the axial passage;*

*means for engaging one side of the ring to compress the ring and grip the cable in response to longitudinal connecting movement of said members toward each other; and*

*variable means mounted on one of said members for engaging an opposite side of the ring, the variable means being positionally adjustable axially on said one member to vary the distance the ring can resiliently move radially and thereby accommodate cables of varying diameters.*

*29. The assembly of claim 28 wherein said ring comprises an annular spring.*

*30. The assembly of claim 28 wherein said variable means is washer-shaped and includes surface means for engaging the ring at different axial locations in response to positionally varying the variable means.*

*31. The assembly of claim 30 wherein said one member has ledge means for mounting the washer-shaped variable means, the variable means being shaped to have different axial dimensions in a direction facing the ring depending on the position in which the variable means is mounted on said ledge means.*

*32. The assembly of claim 31 wherein said washer-shaped variable means has a radially outwardly directed flange for engaging the ledge means of said one member, the variable means having a greater axial dimension on one side of the flange than the other whereby the variable means can be positionally reversed to change the axial location at which the variable means engages the ring.*

*33. The assembly of claim 28 wherein said one member and said variable means have complementarily engageable mounting means, and the variable means has a greater axial dimension on one side of the mounting means than the other whereby the variable means can be positionally reversed to change the axial location at which the variable means engages the ring.*

*34. A backshell assembly for strain relief mounting to a cable, said assembly comprising:*

*a metallic backshell having opposed forward and rearward ends and a cable receiving aperture extending therebetween;*

*a metallic coiled grounding spring formed into a compressible toroidal configuration and disposed in the metallic backshell;*

*a first concave cam means disposed adjacent said grounding spring for radially compressing the grounding spring;*

*plunger means for effecting relative movement between the grounding spring and the first concave cam means;*

*a coiled strain relief spring formed into a compressible toroidal configuration and disposed adjacent said plunger means and spaced from said grounding spring;*

*a second concave cam means disposed adjacent said strain relief spring for radially compressing the strain relief spring;*

*compression means engaged with the metallic backshell for generating relative movement between the second cam means and the strain relief spring, and for generating corresponding movement of the plunger means; and*

*variable means mounted on one of said backshell and compression means for engaging the respectively adjacent spring on a side thereof opposite the plunger means, the variable means being positionally variable axially to vary the distance said adjacent spring can resiliently move radially and thereby accommodate cables of varying diameters.*

* * * * *